(12) United States Patent
Yang et al.

(10) Patent No.: US 11,682,238 B2
(45) Date of Patent: Jun. 20, 2023

(54) RE-TIMING A VIDEO SEQUENCE TO AN AUDIO SEQUENCE BASED ON MOTION AND AUDIO BEAT DETECTION

(71) Applicant: Adobe Inc., San Jose, CA (US)

(72) Inventors: Jimei Yang, Mountain View, CA (US); Deepali Aneja, Seattle, WA (US); Dingzeyu Li, Seattle, WA (US); Jun Saito, Seattle, WA (US); Yang Zhou, Amherst, MA (US)

(73) Assignee: Adobe Inc., San Jose, CA (US)

( * ) Notice: Subject to any disclaimer, the term of this patent is extended or adjusted under 35 U.S.C. 154(b) by 80 days.

(21) Appl. No.: 17/175,441

(22) Filed: Feb. 12, 2021

(65) Prior Publication Data

US 2022/0261573 A1  Aug. 18, 2022

(51) Int. Cl.
| | |
|---|---|
| *G06V 40/20* | (2022.01) |
| *G06T 7/215* | (2017.01) |
| *G06V 20/40* | (2022.01) |
| *G06V 40/10* | (2022.01) |
| *H04N 5/06* | (2006.01) |
| *H04N 21/8547* | (2011.01) |
| *G11B 27/031* | (2006.01) |
| *G10H 1/36* | (2006.01) |
| *G11B 27/10* | (2006.01) |
| *H04N 21/845* | (2011.01) |

(52) U.S. Cl.
CPC .............. *G06V 40/23* (2022.01); *G06T 7/215* (2017.01); *G06V 20/41* (2022.01); *G06V 20/46* (2022.01); *G06V 40/103* (2022.01); *H04N 5/06* (2013.01); *H04N 21/8456* (2013.01); *H04N 21/8547* (2013.01)

(58) Field of Classification Search
USPC .................................. 386/278–290, 239–248
See application file for complete search history.

(56) References Cited

U.S. PATENT DOCUMENTS

| | | | | |
|---|---|---|---|---|
| 2004/0027369 | A1* | 2/2004 | Kellock ................ | G11B 27/034 |
| 2010/0175538 | A1* | 7/2010 | Yagi ......................... | G10H 1/40 |
| | | | | 84/611 |
| 2019/0022860 | A1* | 1/2019 | Kishi ...................... | G06T 13/40 |

OTHER PUBLICATIONS

Chu et al, "Rhythm of Motion Extraction and Rhythm-Based Cross-Media Alignment for Dance Videos," IEEE Transactions on Multimedia, vol. 14, No. 1, Feb. 2012. (Year: 2012).*

(Continued)

*Primary Examiner* — Hung Q Dang
(74) *Attorney, Agent, or Firm* — NDWE LLP

(57) ABSTRACT

Embodiments are disclosed for re-timing a video sequence to an audio sequence based on the detection of motion beats in the video sequence and audio beats in the audio sequence. In particular, in one or more embodiments, the disclosed systems and methods comprise receiving a first input, the first input including a video sequence, detecting motion beats in the video sequence, receiving a second input, the second input including an audio sequence, detecting audio beats in the audio sequence, modifying the video sequence by matching the detected motions beats in the video sequence to the detected audio beats in the audio sequence, and outputting the modified video sequence.

20 Claims, 9 Drawing Sheets

(56) References Cited

OTHER PUBLICATIONS

Bellini et al., "Dance to the beat: Synchronizing motion to audio," Computational Visual Media https://doi.org/10.1007/s41095-018-0115-y vol. 4, No. 3, Sep. 2018, 197-208. (Year: 2018).*

Shiratori et al., "Synthesizing Dance Performance Using Musical and Motion Features," Proceedings of the 2006 IEEE International Conference on Robotics and Automation Orlando, Florida—May 2006 (Year: 2006).*

Kim et al., "Rhythmic-Motion Syntheses Based on Motion-Beat Analysis", Korea Advanced Institute of Science and Technology, ACM Transaction on Graphics, vol. 22, Issue 3, 2003 (SIGGRAPH 2003), pp. 392-401. (Year: 2003).*

Boeck, S et al., "Evaluating the Online Capabilities of Onset Detection Methods," 13th International Society for Music Information Retrieval Conference (ISMIR), Oct. 2012, pp. 49-54.

Cao, Z. et al., "Realtime Multi-Person 2D Pose Estimation using Part Affinity Fields," 2017 IEEE Conference on Computer Vision and Pattern Recognition (CVPR), arXiv:1611.08050v2, Apr. 14, 2017, pp. 1302-1310.

Casiez, G. et al., 1€ Filter: A Simple Speed-based Low-pass Filter for Noisy Input in Interactive Systems. CHI'12, the 30th Conference on Human Factors in Computing Systems, May 2012, pp. 2527-2530.

Davis, A. et al., "Visual Rhythm and Beat," ACM Transactions on Graphics, vol. 37, No. 4, Article 122, Aug. 2018, pp. 1-11.

Ellis, D.P.W., "Beat Tracking by Dynamic Programming," Journal of New Music Research, 36(1), Jul. 16, 2007, pp. 51-60.

\* cited by examiner

RE-TIMING A VIDEO SEQUENCE TO AN AUDIO SEQUENCE BASED ON MOTION AND AUDIO BEAT DETECTION

BACKGROUND

Computing devices (e.g., computers, tablets, smart phones) provide numerous ways for users to capture, create, share, view, and otherwise edit numerous types of digital content (e.g., digital images and digital videos). One example of digital video editing includes adding an audio track to the digital video. However, if the subject of the video is off-beat or out of rhythm with the audio track, overlaying the audio track on the digital video can produce an unappealing result.

Some existing solutions identify any movements within the frame of a digital video and attempt to match those movements to music. However, these solutions perform poorly when there are multiple moving objects, a non-static background, and/or camera movements. As these solutions register any movements regardless of their source, they cannot distinguish relevant movements from irrelevant movements, resulting in the identification of unwanted movements. Other solutions overlay additional content into a digital video, such as an animation or similar content, and synchronize the additional content with music. However, while these solutions match the overlaid content to music, they do not match the underlying video to the music.

These and other problems exist with regards to re-timing digital video content to audio.

SUMMARY

Introduced here are techniques/technologies that allow a digital design system to re-time a video sequence to an audio sequence. The digital design system can receive the sequences as inputs and analyze the video sequence to identify the motion beats of a central subject of the video sequence (e.g., a moving person) and analyze the audio sequence to identify the audio beats of the audio sequence. In analyzing the video sequence, the digital design system can apply a body tracking algorithm to isolate the central subject of the video sequence for determining the motion beats. By isolating the central subject of the video sequence such that any motion from the camera and/or other background elements of the video sequence are disregarded, embodiments of the present disclosure provide benefits and/or solve one or more of the foregoing or other problems in the existing systems.

In particular, in one or more embodiments, a digital design system can receive one or more inputs that include at least one video sequence and an audio sequence. The digital design can then analyze the video sequence to identify the motion beats in the video sequence and analyze the audio sequence to identify the audio beats in the audio sequence.

In some embodiments, the digital design system detects the motion beats in the video sequence by first identifying a central subject (e.g., a moving person) in the video sequence and then applying a body tracking algorithm to the central subject to identifying points of interests (e.g., body parts, joints, regions, etc.). After tracking each point of interest across all frames of the video sequence, the digital design system can select motion peaks associated with one or more points of interest as motion beat. In some embodiments, the digital design system also detects the audio beats in the audio sequence by determining a tempo within the audio sequence and selecting onset peaks correlated to the determined tempo.

The digital design system then modifies the video sequence by matching the detected motions beats in the video sequence to the detected audio beats in the audio sequence. In one or more embodiments, the digital design system modifies the video sequence by dynamically warping segments of the video sequence by aligning each timestamp for the detected motion beats to one of a plurality of timestamps for the detected audio beats.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
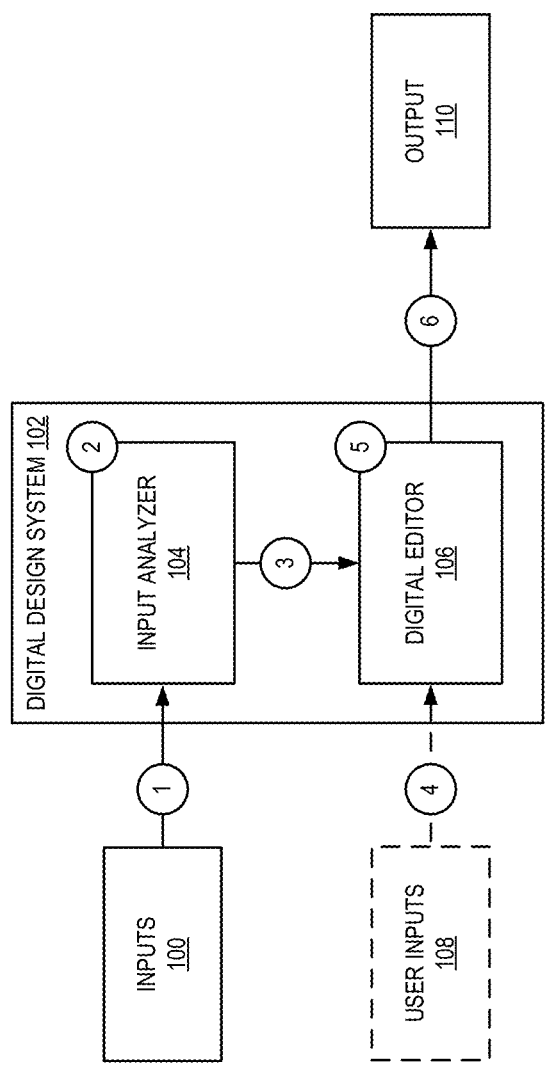
FIG. 1 illustrates a diagram of a process of re-timing a video sequence to an audio sequence based on the beat detection in accordance with one or more embodiments.

One or more embodiments of the present disclosure include a digital design system for re-timing a video sequence to an audio sequence based on the detection of motion beats in the video sequence and audio beats in the audio sequence. Motion beats can be the key moments or frames within the video sequence where the human body shows the strongest movements. Examples of movements that may be identified as motion beats include a foot stomps on the floor, a hand reaching outward, a foot kicking outwards, etc. Audio beats are the basic rhythmic unit of a measure in a given piece of music. While many systems can perform matching of a video sequence to an audio sequence, they have their disadvantages.

For example, in one existing solution, motion beats are detected based on the optical flow difference between consecutive frames, while making no distinction between the motion of a central subject (e.g., a person), the background, or the camera. As a result, in such systems, even minor camera motions, which would be easily ignored by human viewers, can create large visual impacts and lead to the selection of incorrect motion beats. A similar problem can occur where the movements of one or more other subjects, in addition to the central subject, are in the video sequence (e.g., a person walks behind the central subject). These other subjects can create large visual impacts that can result in the selection of incorrect motion beats.

Yet other existing systems take a different approach. For example, one existing system detects the audio beats from an audio sequence and creates markers on the video sequence based on the audio beats for editing, to add effects to the video when audio beats are detected. However, these systems do not take the motion of the central subject in the video sequence into consideration.

To address these issues, after receiving the video sequence and audio sequence as inputs, the digital design system detects the motion beats of the central subject based on the application of body tracking algorithm and onset strength detection, and the audio beats using onset strength detection. The body tracking algorithm can identify the central subject and track specific body parts and/regions of the central subject. For example, the body tracking algorithm can recognize and track the head, chest, shoulders, elbows, wrists, legs, knees, etc., of the central subject as joint trajectories. By applying a body tracking algorithm to the video sequence, such that only the movements of the identified or selected joints of the central subject are tracked, any camera movements and/or movements in the background by anything other than the tracked central subject are not registered as motion beats. Identifying the motion beats based on the movements of just the central subject improves the accuracy of the motion beats detection.

The one or more embodiments of the present disclosure can be applied to dub existing dancing/moving videos to different music having different beats per minute, to correct off-beat dancing, and to dub videos including non-dancing rhythmic human activity to music, etc.

FIG. 1 illustrates a diagram of a process of re-timing a video sequence to an audio sequence based on the beat detection in accordance with one or more embodiments. As shown in FIG. 1, in one or more embodiments, a digital design system 102 receives inputs 100 as part of a request to perform a re-timing process, as shown at numeral 1. In one or more embodiments, the inputs 100 include at least an audio sequence and a video sequence to be re-timed. For example, the digital design system 102 receives the video sequence and the audio sequence from a user via a computing device. In one or more embodiments, the digital design system 102 receives the video sequence and the audio sequence simultaneously or serially. In one or more embodiments, the digital design system can receive a plurality of video sequences or a single video sequence including a plurality of isolated moving person (e.g., each moving person in a separate portion of a split-screened video sequence). In one example, a user may select files including the video sequence and the audio sequence in a video editing application. In another example, a user may submit files including the video sequence and the audio sequence to a web service or an application configured to receive video and audio sequences as inputs. In one or more embodiments, the digital design system 102 includes an input analyzer 104 that receives the inputs 100.

In one or more embodiments, the input analyzer 104 analyzes the inputs 100, as shown at numeral 2. In one or more embodiments, the input analyzer 104 analyzes the video sequence to identify motion beats in the video sequence. In one or more embodiments, the input analyzer 104 applies a body tracking algorithm to a moving person (e.g., a central subject) in the video sequence to determine points of interests on the moving person. Some examples of points of interests on the moving person include specific parts or regions of a body (e.g., head, chest, shoulders, elbows, wrists, legs, knees, etc.). In one or more embodiments, by analyzing each of the points of interest throughout the video sequence, the input analyzer 104 can identify motions beats as the motion peaks associated with each point of interest. The input analyzer 104 can further determine timestamp data associated with each of the motion beats.

The input analyzer 104 can also analyze the audio sequence to identify audio beats in the audio sequence. The input analyzer 104 can further determine timestamp data associated with each of the identified audio beats.

In one or more embodiments, after the input analyzer 104 determines the motion beats and the audios beats data from the input video sequence and audio sequence, respectively, the motion and audio beats data is sent to the digital editor 106, as shown at numeral 3. In one or more other embodiments, the input analyzer 104 stores the motion and audio beats data in a memory or storage for later access by the digital editor 106.

In one or more embodiments, the digital editor 106 processes all of the detected motion beats and the audio beats by default. In one or more other embodiments, the digital design system 102 receives optional user inputs 108, as shown at numeral 4. In one or more embodiments, the user inputs 108 include user customizations related to the motion and audio beats data. Example user inputs 108 can include user selection of a subset of the set of points of interests on the moving person, user selection or deselection of one or more motion beats and/or audio beats determined by the input analyzer at numeral 2, user selection of motion beats for looping and/or inverse effects, etc.

In one or more embodiments, the digital editor 106 processes the motion and audio beats data, as shown at numeral 5. In one or more embodiments, the digital editor 106 re-times, or warps, the input video sequence to align the timestamps of the identified motion beats of the video sequence with the timestamps of the identified audio beats of the audio sequence. In one or more embodiments, the alignment starts from the first detected motion and audio beats and propagates sequentially through the rest of the motion and audio beats until the earliest final beat from either the motion or audio beats is reached.

At numeral 6, the digital design system 102 returns an output 110 including the modified video sequence to the user. In one or more embodiments, after the process described above in numerals 1-4, the output 110 is sent to the user or computing device that initiated the re-timing process with the digital design system 102. For example, after the process described above in numerals 1-4, the modified video sequence can be displayed in the user interface.

Figure 2:
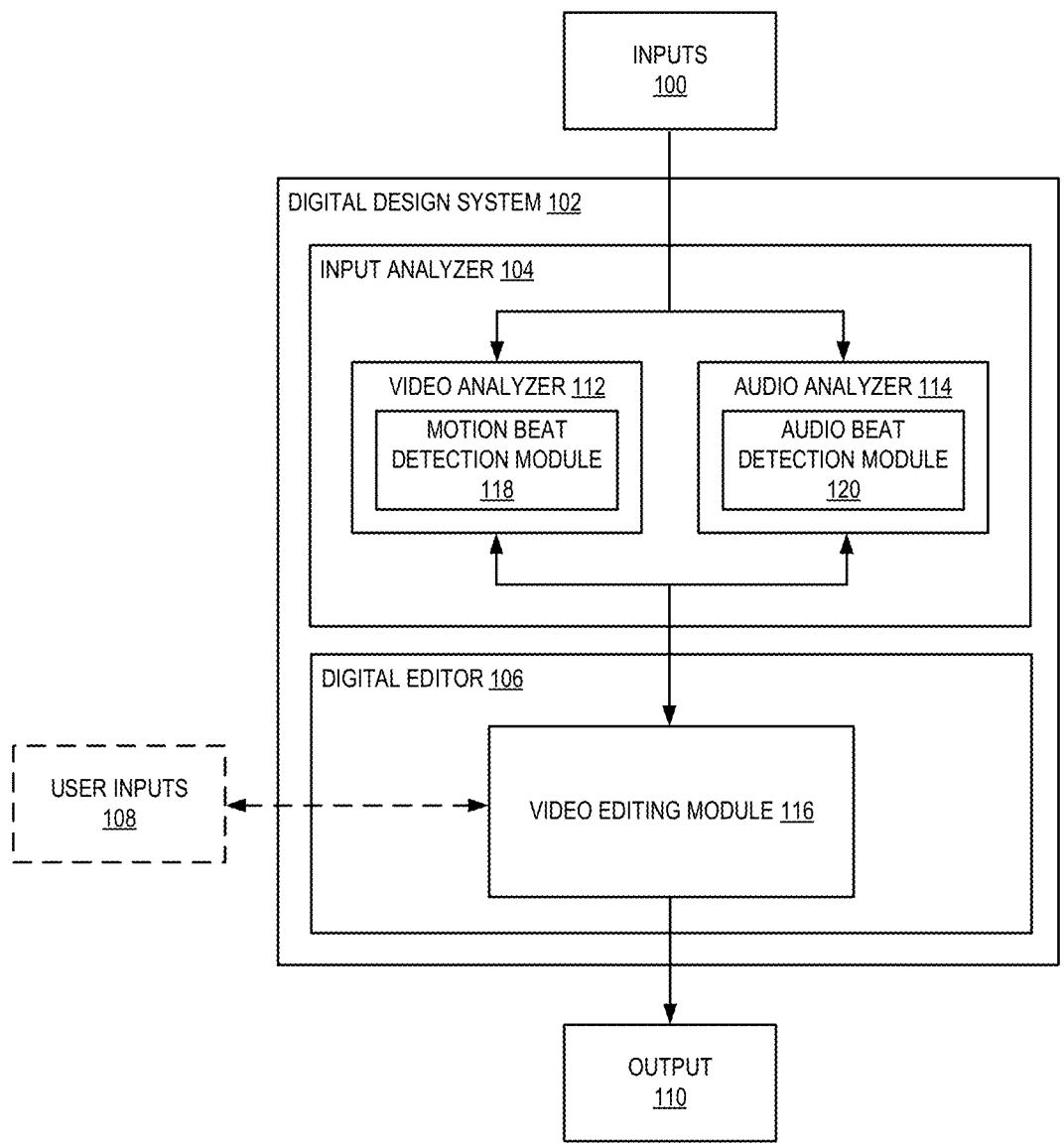
FIG. 2 illustrates a diagram of an example digital design system in accordance with one or more embodiments.

FIG. 2 illustrates a diagram of an example digital design system in accordance with one or more embodiments. In FIG. 2, the digital design system 102 includes an input analyzer 104 and a digital editor 106. As illustrated, the input analyzer 104 includes a video analyzer 112 and an audio analyzer 114, and the digital editor 106 includes a video editing module 116. In other embodiments, the digital design system 102 may include additional, fewer, and/or different modules than illustrated in FIG. 2.

As illustrated in FIG. 2, when the digital design system 102 receives inputs 100, the inputs 100 are provided to an input analyzer 104. In one or more embodiments, the input analyzer 104 receives the inputs 100 from a user (e.g., from a user computing device or via information provided by the user via the user computing device). In one or more embodiments, the inputs 100 includes at least one videos sequence and an audio sequence. In one or more embodiments, the video sequence includes only video data without embedded audio data. In one or more other embodiments, where the video sequence includes embedded audio data, the embedded audio data is removed from the video sequence.

In one or more embodiments, the inputs 100 can include multiple video sequences. For example, each video sequence of the multiple video sequences can be provided to be re-timed with a single audio sequence. In one or more embodiments, the inputs 100 includes a single video sequence including multiple split-screened video sequences. In one or more embodiments, the video sequence in the inputs 100 is provided to or received by the video analyzer 112, and the audio sequence in the inputs 100 is provided to or received by the audio analyzer 114.

In one or more embodiments, a motion beat detection module 118 identifies a moving or dancing person (the central subject) in the video and applies a body tracking algorithm to the central subject. In one or more embodiments, the body tracking algorithm tracks certain points of interests (e.g., body parts/regions, including head, chest, shoulders, elbows, wrists, legs, knees, etc.) as joint trajectories with corresponding confidence scores. In one or more embodiments, the body tracking algorithm produces two-dimensional locations of the points of interests for the central subject in the video sequence. In one or more embodiments, to address tracking noises, the motion beat detection module 118 can smooth the trajectories of the points of interest with one-euro filter smoothing. In one or more embodiments, the body tracking algorithm can be configured as understood by one of ordinary skill in the art. In one or more embodiments, by identifying the central subject and applying the body tracking algorithm to the central subject, the movements of any other objects or people can be discounted.

In one or more embodiments, for each body part/joint, the motion beat detection module 118 defines a fine-granted position representation with N dimensions, where N can be defined as any value. Assuming the body part/joint is a left wrist, the motion beat detection module 118 analyzes the movements of the left wrist throughout the video sequence and calculates the average position of the left wrist throughout the video sequence, $p_m$, defined as:

$$p_m \in \mathbb{R}^2$$

where p is a two-dimensional representation of the position in the x-y domain.

In one or more embodiments, the motion beat detection module 118 can then determine the furthest distance, d, from the average position, $p_m$, that the joint reached, defined as:

$$d = \max_i \|p_i - p_m\|_2 \forall i$$

The motion beat detection module 118 then selects N points ($e_i \forall i=1, \ldots, N$) evenly distributed along a ring centered at the average position, $p_m$, with a radius, d. The position of the left wrist joint can then be represented in any given frame of the video sequence using the position of the left wrist in the frame, $p_t$, where t is time, and the distance of $p_t$ from each of the evenly distributed N points, $e_1$ to $e_N$, as follows:

$$\tilde{p}_t = [\|p_t - e_1\|_2, \ldots, \|p_t - e_N\|_2],$$

where $p_t$ represents the distribution of the motion of a particular point of interest in different directions at a given timestamp.

Figure 3:
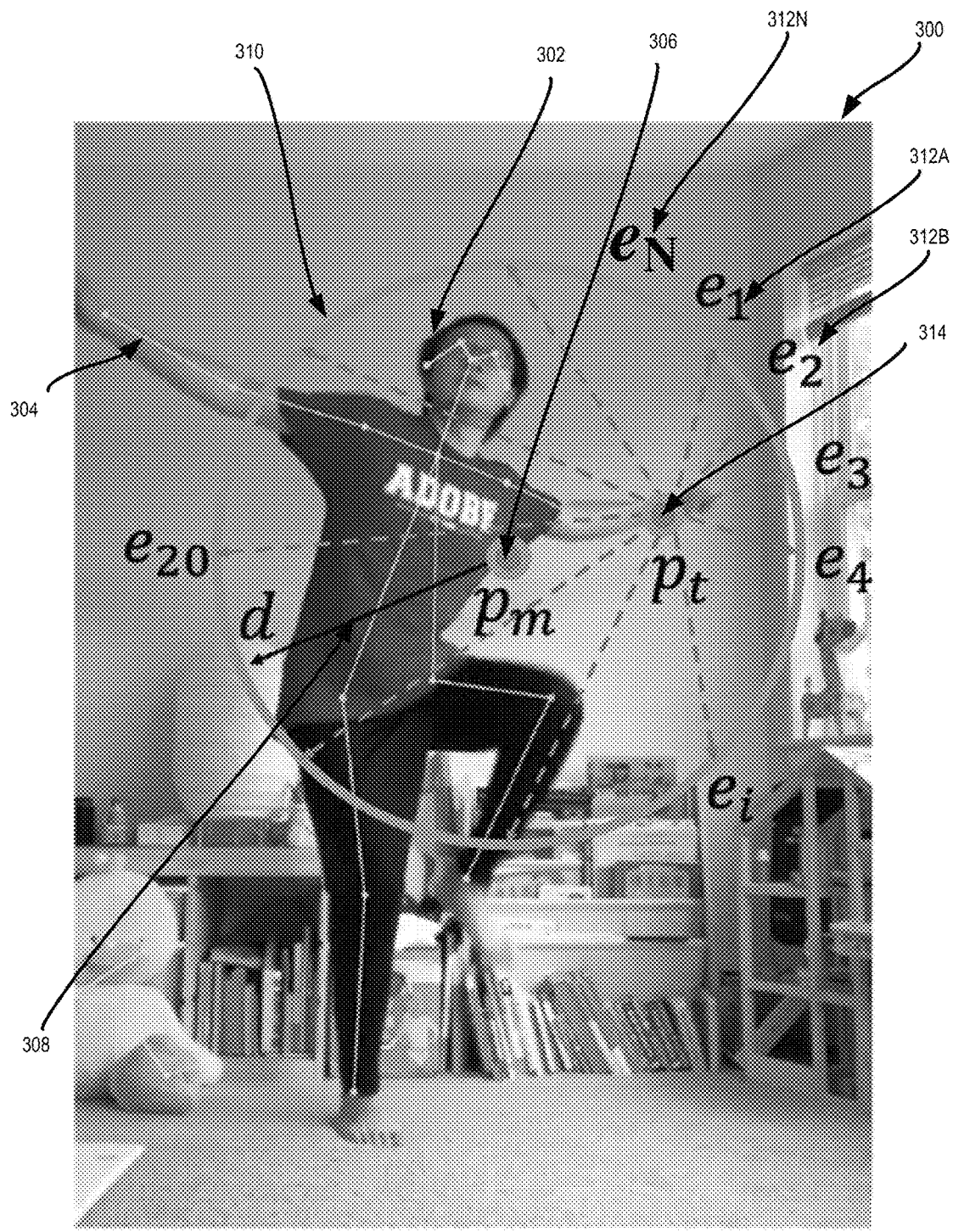
FIG. 3 illustrates an example result of processing a video sequence in accordance with one or more embodiments.

FIG. 3 illustrates an example result of processing a video sequence in accordance with one or more embodiments. FIG. 3 includes a frame 300 of a video sequence that includes a central subject 302 with a body tracking frame 304. The body tracking frame 304 includes a plurality of points of interests (e.g., joints, body parts, body regions, etc.) denoted by the white points along the body tracking frame 304.

FIG. 3 illustrates the result of processing the movements of the left wrist of the central subject 302 throughout all frames of the video sequence. Based on the processing by the motion beat detection module 118, the average position of the left wrist 306 in the video sequence is located at $p_m$. Further, the motion beat detection module 118 determined that the furthest distance of the left wrist from the average position of the left wrist 306 is the distance d, illustrated by a vector 308. As described above, the motion beat detection module 118 then creates a ring 310 associated with the left wrist, with the average position of the left wrist 306 as the center of the ring and the radius of the ring defined by the length of vector 308. The motion beat detection module 118 then selects N points that are evenly distributed along the ring 310, illustrated as points 312A-312N. In the example of FIG. 3, N is defined as 36. However, the value of N can be defined as any value.

After the motion beat detection module 118 generates the ring 310 centered at $p_m$ 306, the position of any point (e.g., $p_t$ 314) can be represented based on its distance from each of the N points evenly distributed along the ring 310. For example, the dashed vectors between $p_t$ 314 and the plurality of points 312A-312N represent the vector distances used to represent the position of $p_t$ 314. In one or more embodiments, the process illustrated above and in FIG. 3 is repeated for each point of interest at each frame of the video sequence.

Figure 4:
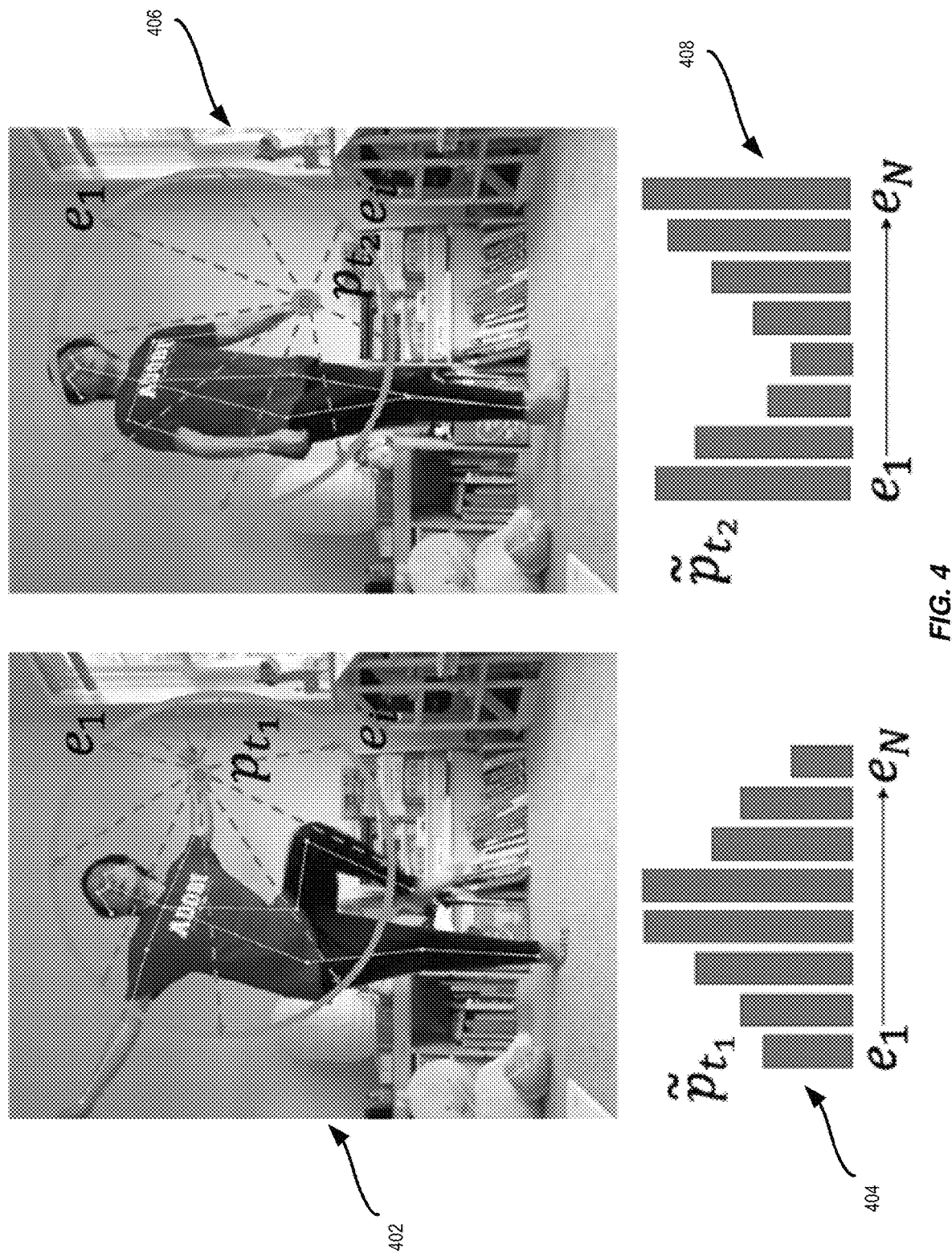
FIG. 4 illustrates example representations of a point of interest in different frames of a video sequence in accordance with one or more embodiments.

FIG. 4 illustrates example representations of a point of interest in different frames of a video sequence in accordance with one or more embodiments. FIG. 4 illustrates a first frame of the video sequence 402 and a second frame of the video sequence 406. The first frame of the video sequence 402 depicts the left wrist as the point of interest and located at $p_{t_1}$, and the second frame of the video sequence 406 depicts the left wrist as the point of interest and located at $p_{t_2}$. After the motion beat detection module 118 processes the video sequence, the location of $p_{t_1}$ and $p_{t_2}$ can be represented using the position of the left wrist in the frame and its distance from each of the evenly distributed N points, $e_1$ to $e_N$. Bar graph 404 is a representation of the location of the left wrist in the first frame, or first timestamp, of the video sequence 402 relative to the evenly distributed N points, and bar graph 408 is a representation of the location of the left wrist in the second frame, or second timestamp, of the video sequence 406 relative to the evenly distributed N points. In one or more embodiments, the computed $\tilde{p}_t$ features for a point of interest are concatenated in the time-axis to form a motion spectrogram for that point of interest.

Returning to FIG. 2, after the $\tilde{p}_t$ features are computed for each point of interest, the motion beat detection module 118 creates a motion spectrogram for each point of interest using the computed $\tilde{p}_t$ features, extracts an onset envelope from each motion spectrogram, masks out values based on the confidence scores for each point of interest in each frame of the video sequence, and combines the onset envelopes of all points of interests to detect the motion beats.

In one or more embodiments, the motion beat detection module 118 can determine the onset envelope from the generated motion spectrogram in a variety of ways as would be understood by one of ordinary skill in the art. In one or more embodiments, the motion beat detection module 118 calculates the motion onset envelope using a library (e.g., librosa).

In one or more embodiments, the motion beat detection module 118 calculates a confidence score for each point of interest in each frame of the video sequence. Based on each point of interest's confidence score in each frame, the motion beat detection module 118 masks out the onset envelope or position data (e.g., sets the value to "0") if the confidence score is below a threshold value. In one or more embodiments, a low confidence score for a point of interest at a given frame can be the result of the motion beat detection module 118 capturing incomplete data for the point of interest at that frame.

In one or more embodiments, the motion beat detection module 118 combines the onset envelopes from all of the points of interest by averaging the onset envelopes from the points of interest to be the final onset envelope. In one or more embodiments, the motion beat detection module 118, based on heuristics, then selects the onset peaks from the final onset envelope as the motion beats. In such embodiments, if a selected onset value satisfies one or more conditions, the motion beat detection module 118 selects the onset value as a motion beat. In some embodiments, the motion beat detection module 118 checks one or more of the following conditions for each selected onset values: whether the onset value is the max within a pre-defined time window surrounding that frame, whether the onset value is larger than the average within a pre-defined time window surrounding that frame, and whether the onset value is at least a pre-defined distance away (e.g., in time) from the onset peak previously selected. In one or more embodiments, the motion beat detection module 118 also identifies and stores the timestamps of the video sequence for each of the motion beats.

In one or more embodiments, an audio beat detection module 120 processes the audio sequence to determine the audio beats of the audio sequence. In one or more embodiments, to detect the audio beats periodically or dynamically, the audio beat detection module 120 first computes the spectral flux onset strength envelope (e.g., detect audio onsets) from the given audio sequence. In one or more embodiments, the audio onset envelope can be calculated in a variety of ways, including using a library (e.g., librosa). In one or more embodiments, the audio beat detection module 120 determines the estimated periodical tempo by processing the entire audio sequence. In one or more embodiments, for periodic beats, the audio beat detection module 120 estimates the periodical tempo and chooses peaks in the onsets approximately consistent with the estimated periodical tempo. As a result, the peaks in the onsets selected as the audio beats may not include one or more of the higher peaks in the onsets. For example, in FIG. 5, peak 508 is not selected because it is not consistent with the estimated periodical tempo.

In one or more embodiments, for dynamic beats (e.g., where the time duration between two beats is different for different pairs of consecutive beats), instead of estimating a periodical tempo, the audio beat detection module 120 selects the audio onset peaks using a flexible heuristic. For example, the audio beat detection module 120 applies a rectangular window filter (e.g., window size 11) over the audio onset signal and calculates its local maximum point and the average strength value. If the local maximum is larger than the average plus a pre-defined threshold, this local maximum can be treated as a plausible onset peak (e.g., an audio beat). The audio beat detection module 120 can apply the window filter in a running manner from the beginning of the audio onset signal to the end, to detect all possible dynamic music beats.

After the motion beat detection module 118 determines the motion beats from the video sequence and the audio beat detection module 120 determines the audio beats from the audio sequence, the data can be sent to the digital editor 106. In one or more embodiments, the data is sent to a storage or memory space for later access by the digital editor 106. When the digital editor 106 receives or accesses the motion beats and audio beats data, the digital editor 106 can pass the data to a video editing module 116.

In one or more embodiments, by default, the video editing module 116 automatically creates a beat-synced modified video sequence based on all of the determined beats. In one or more other embodiments, the motion beats and audio beats data can be displayed to a user for user customizations of the video sequence re-timing. For example, a user can optionally provide user inputs 108 that can include deselecting motion beats that are not necessary to match a music beat (e.g., strong transition motions), selecting only a subsets of detected audios beats for some part of the music to decelerate the playback speed, applying forward/backward/looping effects by setting up a direct, inverse, or looping order of the motion beats, applying non-linear warping to the motion beats instead of applying a linear warping on each aligned video segment, etc.

In one or more embodiments, to match the motion beats and the audio beats, the video editing module 116 dynamically warps the video in time so that the timestamps of the motion beats can aligned with the timestamps of the audio beats. In one or more embodiments, the alignment starts from the first determined motion beat and audio beat by aligning the first motion beat timestamp to the first audio beat timestamp. The video editing module 116 sequentially propagates through the rest of the motion and audio beats until the last determined beat from either the video sequence or audio sequence is reached.

In one or more embodiments, starting from the second motion beat $v_i$, given the previous matched motion and audio beat pair $(v_{i-1}, a_j)$, the video editing module 116 determines the next closest audio beat $a_{j'}$ as follows:

$$j' = j + \operatorname*{argmin}_{k} |r(v_i - v_{i-1}) - (a_{j+k} - a_j)|$$

where r is the overall speed adjust rate. In one or more embodiments, r=1 means there is no overall speech change for the video sequence, while r=0.5 means the video sequence would be overall accelerated 2 times for matching.

In one or more embodiments, a tolerance threshold, σ, can be introduced to reject extreme warping of sections of the video sequence, as warping the video to cause it to run too slow or too fast can result in unpleasing effects. In one of more embodiments, the video editing module 116 will reject the matching of a motion and audio beat pair $(v_i, a_{j'})$ when the following is true:

$$|r(v_i - v_{i-1}) - (a_{j'} - a_j)| > \sigma$$

In such situations, the video editing module 116 can move on to the next unpaired motion beat, e.g., $v_{i+1}$.

In one or more embodiments, after the video editing module 116 determines all of the motion and audio beat matching pairs $(v_i, a_j)$, $\forall i$ sequentially found, the video editing module 116 applies a linear warping on the video to align the $v_i$, $\forall i$ video frame timestamps to paired $a_j$ audio timestamps. In one or more embodiments, the linear warping can include speeding up or slowing down various segments of the video sequence to align the timestamps of each motion and audio beat pair.

Figure 5:
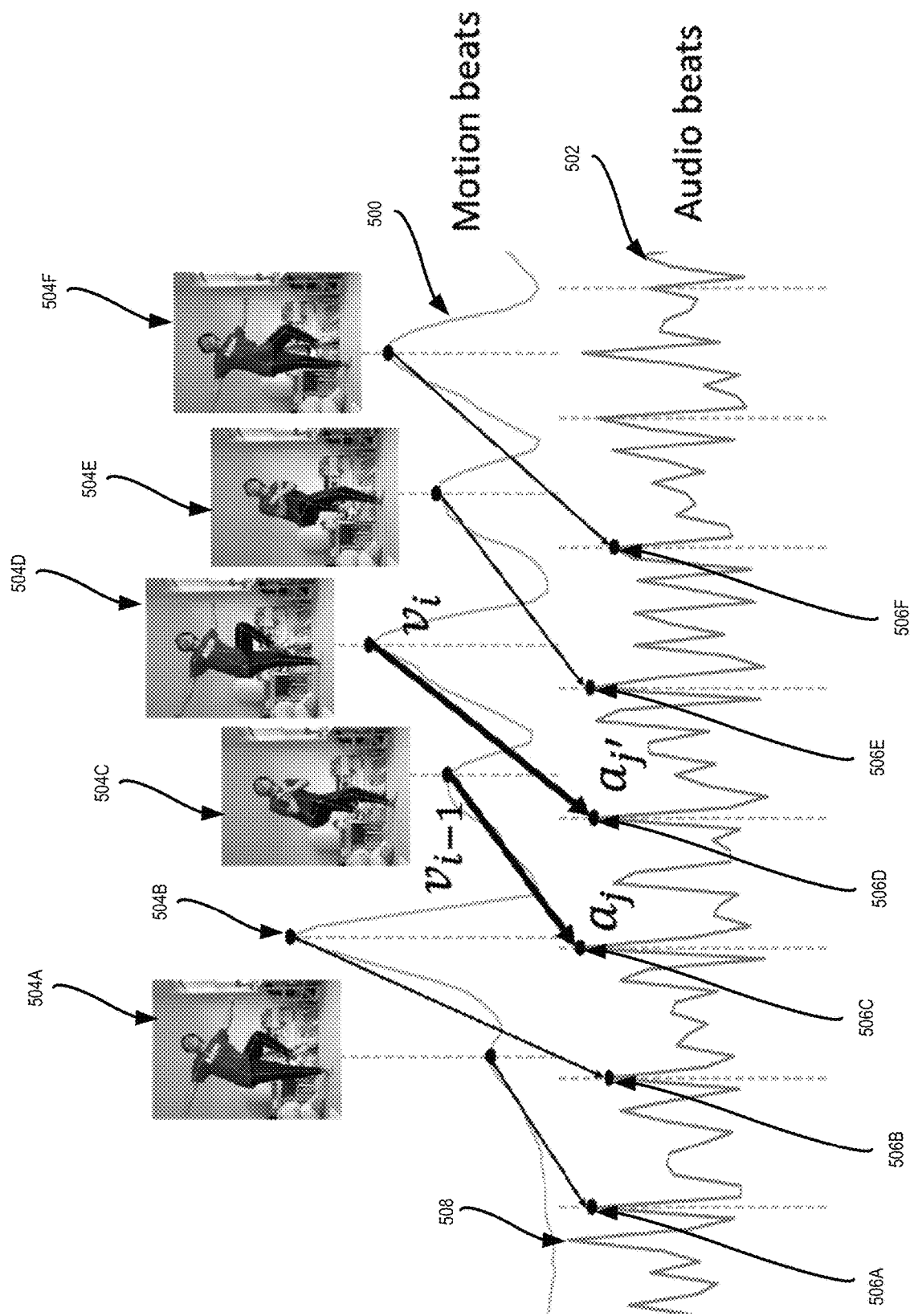
FIG. 5 illustrates the retiming of a video sequence based on motion and audio beast detection in accordance with one or more embodiments.

FIG. 5 illustrates the retiming of a video sequence based on motion and audio beast detection in accordance with one or more embodiments. In FIG. 5, curve 500 depicts a plot of a plurality of motion beats 504A-504F determined from a video sequence, and curve 502 depicts a plot of a plurality of audio beats 506A-506F determined from an audio sequence. As illustrated, the first motion and audio beat pair is motion beat 504A and audio beat 506A. The motion and audio beats are matched until the last motion beat, e.g., motion beat 504F, is reached and paired with audio beat 506F. After the video editing module 116 determines all of the motion and audio beat pairs, the video editing module 116 applies a linear warping on the video to align the timestamps of each motion and audio beat pair to generate the modified video sequence.

When the digital editing module 116 generates the modified video sequence, re-timed based on the motion beats of the original video sequence and the audio beats of the audio sequence, the digital design system 102 returns an output 110 including the modified video sequence. In one or more embodiments, the output 110 is sent to the user computing device that submitted the re-timing request for display. In one or more other embodiments, the output 110 is sent as a file to the user computing device.

Figure 6:
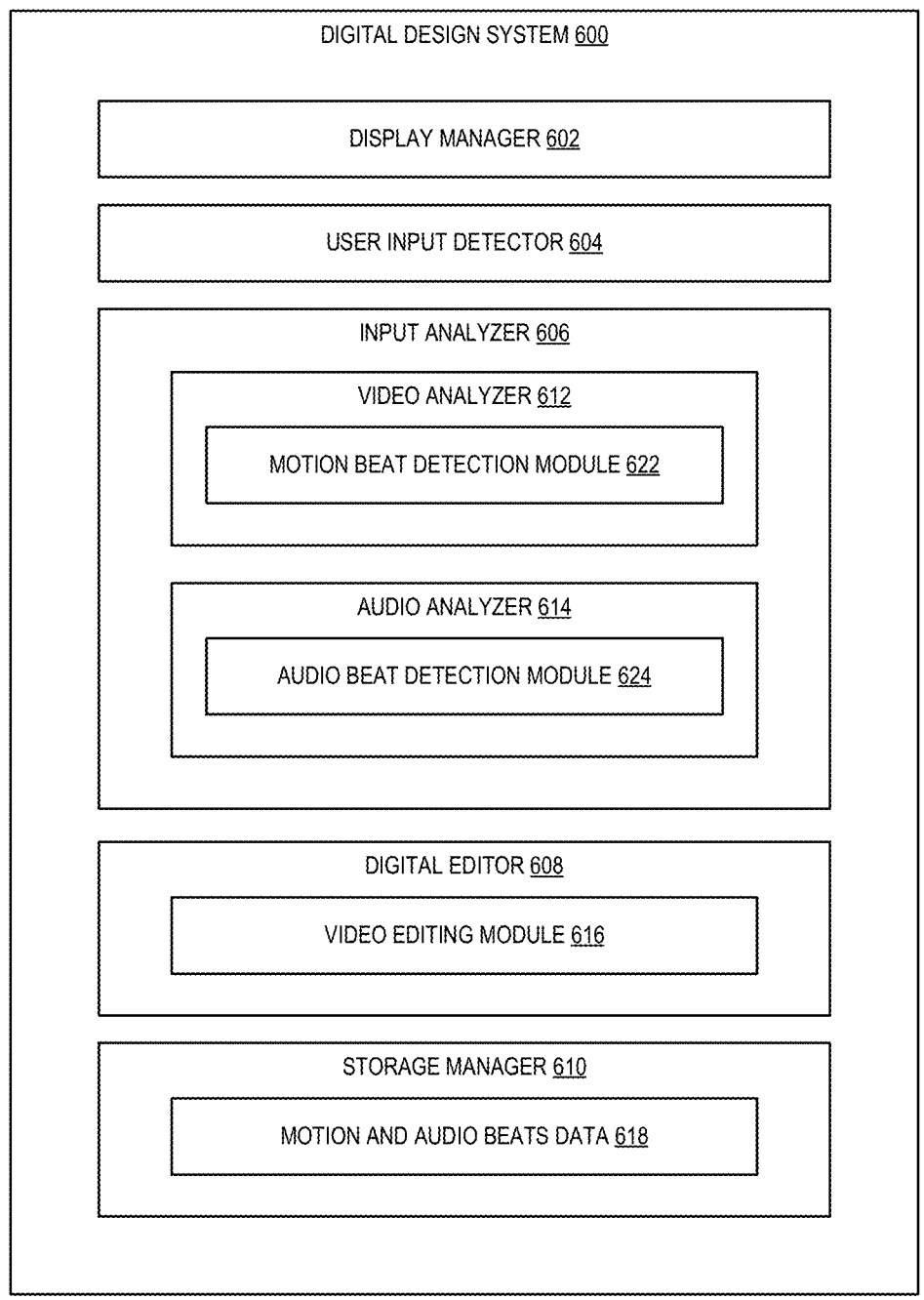
FIG. 6 illustrates a schematic diagram of a digital design system in accordance with one or more embodiments.

FIG. 6 illustrates a schematic diagram of a digital design system (e.g., "digital design system" described above) in accordance with one or more embodiments. As shown, the digital design system 600 may include, but is not limited to, a display manager 602, a user input detector 604, an input analyzer 606, a digital editor 608, and a storage manager 610. As shown the input analyzer 606 includes a video analyzer 612 and an audio analyzer 614. Further, as shown, the digital editor 608 includes a video editing module 616. The storage manager 610 includes motion and audio beats data 618.

As illustrated in FIG. 6, the digital design system 600 includes a display manager 602. In one or more embodiments, the display manager 602 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 602 may identify, display, update, or otherwise provide various user interfaces that include one or more display elements in various layouts. In one or more embodiments, the display manager 602 can identify a display provided on a touch screen. For example, a display provided on a touch screen may include a graphical user interface including one or more display elements capable of being interacted with via one or more touch gestures or other types of user inputs (e.g., using a stylus, a mouse, or other input devices). In one or more other embodiments, the display manager 602 can identify other types of displays (e.g., including monitors, projectors, headsets, etc.) that may be interacted with using a variety of input devices.

More specifically, the display manager 602 can identify a variety of display elements within a graphical user interface as well as the layout of the graphical user interface. For example, the display manager 602 may identify a graphical user interface provided on a touch screen including one or more display elements. Display elements include, but are not limited to, buttons, text boxes, menus, thumbnails, scroll bars, hyperlinks, etc. In one or more embodiments, the display manager 602 can identify a graphical user interface layout as well as the display elements displayed therein.

As further illustrated in FIG. 6, the digital design system 600 also includes a user input detector 604. In one or more embodiments, the user input detector 604 detects, receives, and/or facilitates user input in any suitable manner. In some examples, the user input detector 604 detects one or more user interactions. As referred to herein, a "user interaction" means a single input, or combination of inputs, received from a user by way of one or more input devices, or via one or more touch gestures. A user interaction can have variable duration and may take place relative to a display provided on a touch screen.

For example, the user input detector 604 can detect user inputs performed on a touch screen. In particular, the user input detector 604 can detect one or more touch gestures (e.g., tap gestures, swipe gestures, pinch gestures) provided by a user by way of the touch screen. In some embodiments, the user input detector 604 can detect touch gestures based on one point of contact or multiple points of contact on the touch screen. In some examples, the user input detector 604 can detect touch gestures in relation to and/or directed at one or more display elements displayed as part of a display presented on the touch screen. In one or more embodiments, the user inputs can include those performed by a user to send inputs to the digital design system 600, including media files (e.g., video, audio, etc.), as well as user inputs that provide user customizations used by the digital editor 608 to modify media files.

The user input detector 604 may additionally, or alternatively, receive data representative of a user interaction. For example, the user input detector 604 may receive one or more user configurable parameters from a user, one or more commands from the user, and/or any other suitable user input. In particular, the user input detector 604 can receive voice commands or otherwise sense, detect, or receive user input.

As further illustrated in FIG. 6, the digital design system 600 also includes an input analyzer 606. The input analyzer 606 includes a video analyzer 612 and an audio analyzer 614. The video analyzer 612 includes a motion beat detection module 622 configured to analyze a video sequence and identify one or more motion beats of a central subject in the video sequence. The audio analyzer 614 includes an audio beat detection module 624 configured to analyze an audio sequence and identify one or more audio beats in the audio sequence.

As further illustrated in FIG. 6, the digital design system 600 also includes a digital editor 608. In one or more embodiments, the digital editor 608 includes a video editing module 616 configured to generate a modified video sequence using motion and audio beats data generated by the input analyzer 606. For example, the video editing module 616 can be configured to determine motion beat and audio beat pairs and re-time the video sequence by warping segments of the video sequence to align the timestamps of the motion beat and the audio beat of each motion beat and audio beat pair.

As further illustrated in FIG. 6, the storage manager 610 includes motion and audio beats data 618. In particular, the motion and audio beats data 618 may include any information associated with the motion beats detected from the video sequence and the audio beats detected from the audio sequence. In one or more embodiments, the input analyzer 606 stores the information associated with the motion beats and the audio beats in the motion and audio beats data 618 instead of, or in addition to, sending the data to the digital editor 608. In one or more embodiments, this can include timestamp data for each motion and audio beat. In one or more embodiments, the digital editor 608 can access the motion and audio beats data 618 to retrieve the data for generating a modified video sequence.

Each of the components 602-6100 of the digital design system 600 and their corresponding elements (as shown in FIG. 6) may be in communication with one another using any suitable communication technologies. It will be recognized that although components 602-610 and their corresponding elements are shown to be separate in FIG. 6, any of components 602-610 and their corresponding elements may be combined into fewer components, such as into a single facility or module, divided into more components, or configured into different components as may serve a particular embodiment.

The components 602-610 and their corresponding elements can comprise software, hardware, or both. For example, the components 602-610 and their corresponding elements can comprise one or more instructions stored on a computer-readable storage medium and executable by processors of one or more computing devices. When executed by the one or more processors, the computer-executable instructions of the digital design system 600 can cause a client device and/or a server device to perform the methods described herein. Alternatively, the components 602-610 and their corresponding elements can comprise hardware, such as a special purpose processing device to perform a certain function or group of functions. Additionally, the components 602-610 and their corresponding elements can comprise a combination of computer-executable instructions and hardware.

Furthermore, the components 602-610 of the digital design system 600 may, for example, be implemented as one or more stand-alone applications, as one or more modules of an application, as one or more plug-ins, as one or more library functions or functions that may be called by other applications, and/or as a cloud-computing model. Thus, the components 602-610 of the digital design system 600 may be implemented as a stand-alone application, such as a desktop or mobile application. Furthermore, the components 602-610 of the digital design system 600 may be implemented as one or more web-based applications hosted on a remote server. Alternatively, or additionally, the components of the digital design system 600 may be implemented in a suit of mobile device applications or "apps." To illustrate, the components of the digital design system 600 may be implemented in a document processing application or an image processing application, including but not limited to ADOBE® Premiere Pro. "ADOBE®" is either a registered trademark or trademark of Adobe Inc. in the United States and/or other countries.

Figure 7:
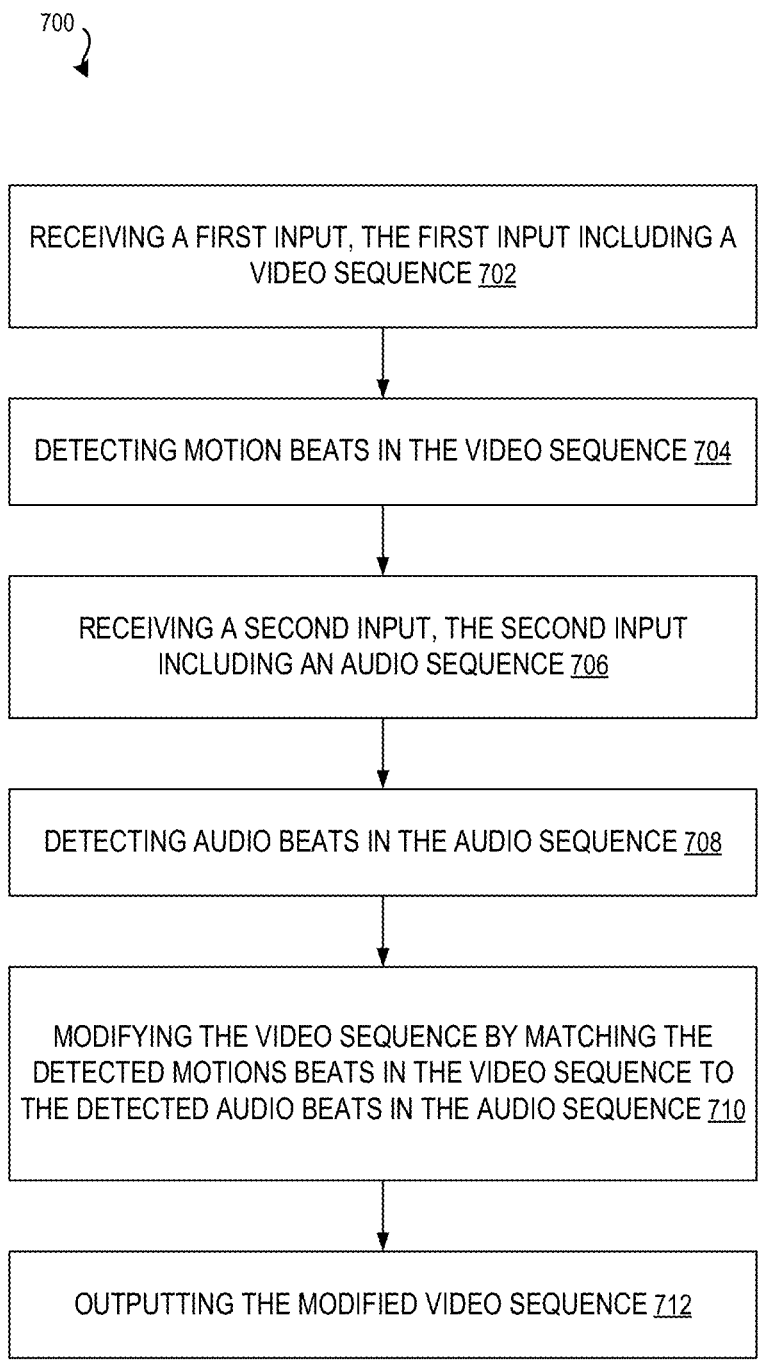
FIG. 7 illustrates a flowchart of a series of acts in a method of re-timing a video sequence to an audio sequence in a digital design system in accordance with one or more embodiments.

FIGS. 1-6, the corresponding text, and the examples, provide a number of different systems and devices that allow a digital design system to re-time a video sequence to an audio sequence based on motion and audio beat detection. In addition to the foregoing, embodiments can also be described in terms of flowcharts comprising acts and steps in a method for accomplishing a particular result. For example, FIG. 7 illustrates a flowchart of an exemplary method in accordance with one or more embodiments. The method described in relation to FIG. 7 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method of re-timing a video sequence to an audio sequence in a digital design system in accordance with one or more embodiments. In one or more embodiments, the method 700 is performed in a digital medium environment that includes the digital design system 600. The method 700 is intended to be illustrative of one or more methods in accordance with the present disclosure and is not intended to limit potential embodiments. Alternative embodiments can include additional, fewer, or different steps than those articulated in FIG. 7.

As shown in FIG. 7, the method 700 includes an act 702 of receiving a first input, where the first input includes a video sequence. In one or more embodiments, the digital design system receives the first input from a user (e.g., via a computing device). In one or more embodiments, the user may select the video sequence in a video editing application, or the user may submit the video sequence to a web service or an application configured to receive inputs. In one or more embodiments, the first input includes at least one video sequence. In one or more embodiments, the video sequence does not include any embedded audio. In one or more other embodiments, the video sequence does include embedded audio, and the digital design system can mask out the embedded audio.

As shown in FIG. 7, the method 700 also includes an act 704 of detecting motion beats in the video sequence. In one or more embodiments, the digital design system applies a body tracking algorithm to a moving person in the video sequence to determine points of interests on the moving person. Some examples of points of interests on the moving person include specific parts or regions of a body (e.g., head, chest, shoulders, elbows, wrists, legs, knees, etc.). The body tracking algorithm can detect the points of interest and generate a body frame with each point of interest tracked as a joint. In one or more embodiments, by analyzing each of the points of interest throughout the video sequence, the digital design system can identify motions beats as the motion peaks associated with each point of interest. The digital design system can further identify timestamp data associated with each of the identified motion beats.

As shown in FIG. 7, the method 700 also includes an act 706 of receiving a second input, where the second input includes an audio sequence. In one or more embodiments, the digital design system can receive the second input before, concurrently with, or after receiving the first input that includes the video sequence. In one or more embodiments, the digital design system receives the second input from a user (e.g., via a computing device). In one or more embodiments, the user may select the audio sequence in a video editing application, or the user may submit the audio sequence to a web service or an application configured to receive inputs.

As shown in FIG. 7, the method 700 also includes an act 708 of detecting audio beats in the audio sequence. In one or more embodiments, the digital design system can detect the audio by analyzing the audio sequence and detecting audio onsets. For periodic audio sequences, the digital design system can estimate the periodic tempo and select peaks in the onsets consistent with the estimated periodic tempo. For dynamic audio sequences, the digital design system applies a rectangular window filter (of a specified window size) over the audio onset signal and calculates its local maximum point and the average strength value. Where a local maximum is larger than the average plus a predefined threshold, the local maximum can be treated as a plausible onset peak or audio beat.

As shown in FIG. 7, the method 700 also includes an act 710 of modifying the video sequence by matching the detected motions beats in the video sequence to the detected audio beats in the audio sequence. In one or more embodiments, after detecting the motion beats in the video sequence and the audio beats in the audio sequence, the digital design system modifies the video sequence matching motion beats and audio beats to create motion and audio beat pairs. For example, the digital design system creates a first pair from the first motion beat and first audio beat, and then creates subsequent pairs until reaching the last motion beat or audio beat, whichever is first. The digital design system then aligns the timestamps of the motion beat and audio beat for each pair warping or re-timing segments of the video sequence. For example, the digital design system can speed up or slow down the video speed of segments of the video sequence to align the timestamps of paired motion and audio beats.

As shown in FIG. 7, the method 700 also includes an act 712 of outputting the modified video sequence. For example, the modified video sequence can be presented on a user interface on the user computing device that submitted the request to re-time the video sequence. In one or more other embodiments, the modified video sequence can be transmitted to the user computing device as a file.

In one or more other embodiments, depending on the motions in the input video sequence, flipping the motion feature as $-\tilde{p}_t$ and detecting its peaks (e.g., the valleys in the original signal) can also achieve good beat results. The application of this method depends on the type of dancing or activity present in the video sequence.

In one or other embodiments, the video sequence can include multiple moving subjects. For example, the video sequence can include subjects in separate split screened sections of the video sequence. In one or more embodiments, the digital design system can segment the separate split screen sections into separate channels, and separately analyze each segment for motion beats. The resulting analysis by the digital design system includes a separate set of motion beats for each of the separate channels, and a single set of audio beats. The digital design system can then perform the methods described above for each of the separate channels to match motion beats to audio beats. Each of the separate channels can then be re-timed or warped individually by aligning each timestamp for the detected motion beats of each of the separate channels to one of a plurality of timestamps for the detected audio beats.

In one or more other embodiments, the video sequence can include multiple moving subjects within a single video sequence (e.g., two or more subjects moving/dancing next to each other). In such embodiments, the digital design system can be configured to isolate each subject within the single video sequence. For example, a human body recognition system can be used to identify each subject. After each subject is recognized, the digital design system can isolate each subject into a separate channel or into separate layers and determine the motion beats for each subject separately, as described above. The digital design system can then perform the methods described above for each of the separate channels or layers to match motion beats to audio beats. Each of the separate channels or layers in the single video sequence can then be re-timed or warped individually by aligning each timestamp for the detected motion beats of each of the separate channels to one of a plurality of timestamps for the detected audio beats. The digital design system can then merge the separate layers into a single layer.

Figure 8:
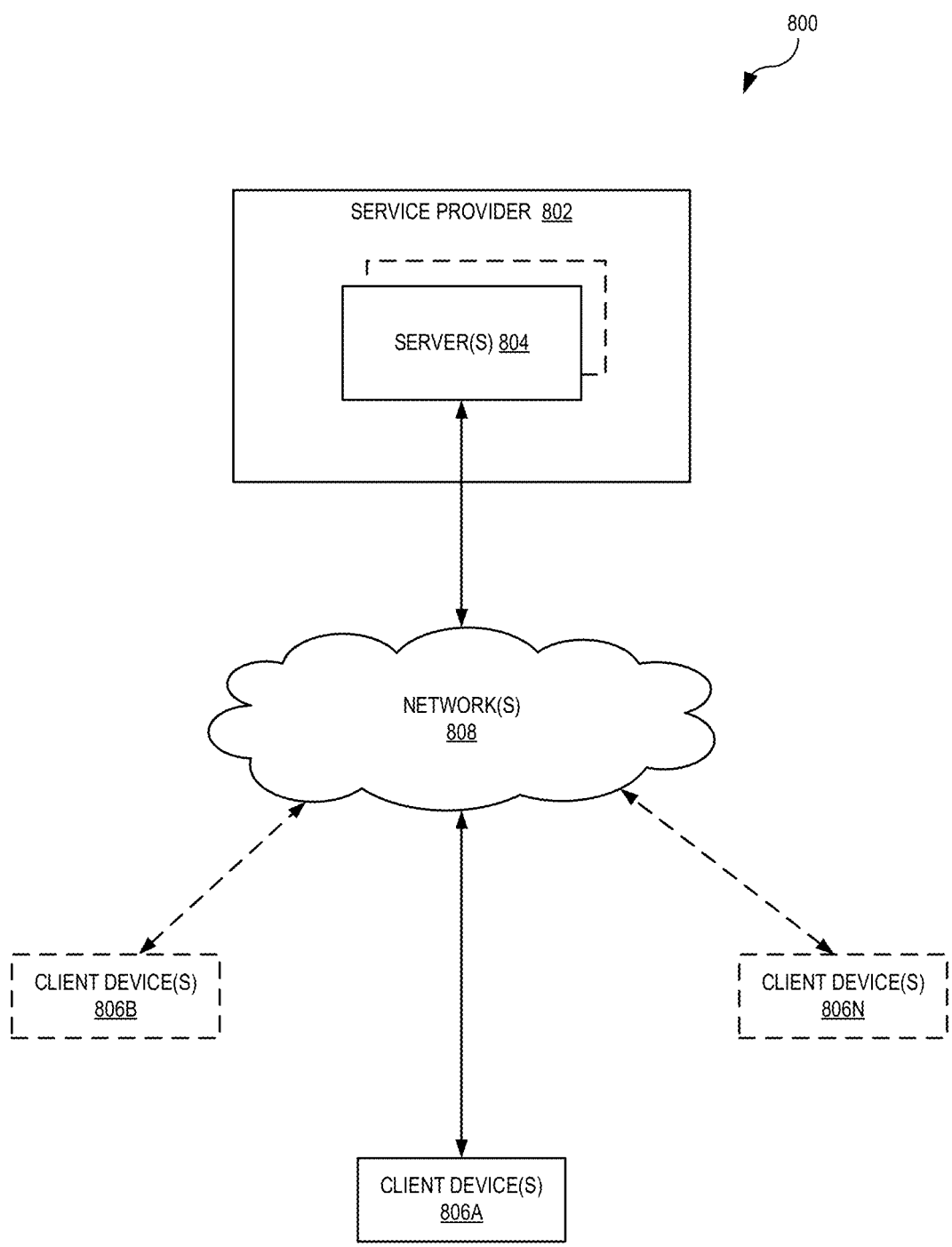
FIG. 8 illustrates a schematic diagram of an exemplary environment in which the digital design system can operate in accordance with one or more embodiments.

FIG. 8 illustrates a schematic diagram of an exemplary environment 800 in which the digital design system 600 can operate in accordance with one or more embodiments. In one or more embodiments, the environment 800 includes a service provider 802 which may include one or more servers 804 connected to a plurality of client devices 806A-806N via one or more networks 808. The client devices 806A-806N, the one or more networks 808, the service provider 802, and the one or more servers 804 may communicate with each other or other components using any communication platforms and technologies suitable for transporting data and/or communication signals, including any known communication technologies, devices, media, and protocols supportive of remote data communications, examples of which will be described in more detail below with respect to FIG. 9.

Although FIG. 8 illustrates a particular arrangement of the client devices 806A-806N, the one or more networks 808, the service provider 802, and the one or more servers 804, various additional arrangements are possible. For example, the client devices 806A-806N may directly communicate with the one or more servers 804, bypassing the network 808. Or alternatively, the client devices 806A-806N may directly communicate with each other. The service provider 802 may be a public cloud service provider which owns and operates their own infrastructure in one or more data centers and provides this infrastructure to customers and end users on demand to host applications on the one or more servers 804. The servers may include one or more hardware servers (e.g., hosts), each with its own computing resources (e.g., processors, memory, disk space, networking bandwidth, etc.) which may be securely divided between multiple customers, each of which may host their own applications on the one or more servers 804. In some embodiments, the service provider may be a private cloud provider which maintains cloud infrastructure for a single organization. The one or more servers 804 may similarly include one or more hardware servers, each with its own computing resources, which are divided among applications hosted by the one or more servers for use by members of the organization or their customers.

Similarly, although the environment 800 of FIG. 8 is depicted as having various components, the environment 800 may have additional or alternative components. For example, the environment 800 can be implemented on a single computing device with the digital design system 600. In particular, the digital design system 600 may be implemented in whole or in part on the client device 806A. Alternatively, in some embodiments, the environment 800 is implemented in a distributed architecture across multiple computing devices.

As illustrated in FIG. 8, the environment 800 may include client devices 806A-806N. The client devices 806A-806N may comprise any computing device. For example, client devices 806A-806N may comprise one or more personal computers, laptop computers, mobile devices, mobile phones, tablets, special purpose computers, TVs, or other computing devices, including computing devices described below with regard to FIG. 9. Although three client devices are shown in FIG. 8, it will be appreciated that client devices 806A-806N may comprise any number of client devices (greater or smaller than shown).

Moreover, as illustrated in FIG. 8, the client devices 806A-806N and the one or more servers 804 may communicate via one or more networks 808. The one or more networks 808 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 808 may be any suitable network over which the client devices 806A-806N may access the service provider 802 and server 804, or vice versa. The one or more networks 808 will be discussed in more detail below with regard to FIG. 9.

In addition, the environment 800 may also include one or more servers 804. The one or more servers 804 may generate, store, receive, and transmit any type of data, including motion and audio beats data 618 or other information. For example, a server 804 may receive data from a client device, such as the client device 806A, and send the data to another client device, such as the client device 806B and/or 806N. The server 804 can also transmit electronic messages between one or more users of the environment 800. In one example embodiment, the server 804 is a data server. The server 804 can also comprise a communication server or a web-hosting server. Additional details regarding the server 804 will be discussed below with respect to FIG. 9.

As mentioned, in one or more embodiments, the one or more servers 804 can include or implement at least a portion of the digital design system 600. In particular, the digital design system 600 can comprise an application running on the one or more servers 804 or a portion of the digital design system 600 can be downloaded from the one or more servers 804. For example, the digital design system 600 can include a web hosting application that allows the client devices 806A-806N to interact with content hosted at the one or more servers 804. To illustrate, in one or more embodiments of the environment 800, one or more client devices 806A-806N can access a webpage supported by the one or more servers 804. In particular, the client device 806A can run a web application (e.g., a web browser) to allow a user to access, view, and/or interact with a webpage or website hosted at the one or more servers 804.

Upon the client device 806A accessing a webpage or other web application hosted at the one or more servers 804, in one or more embodiments, the one or more servers 804 can provide a user of the client device 806A with an interface to provide inputs, including a video sequence and an audio sequence. Upon receiving the video sequence and audio sequence, the one or more servers 804 can automatically perform the methods and processes described above to perform re-timing of the video sequence based on motion of the video sequence and audio beat detection of the audio sequence.

As just described, the digital design system 600 may be implemented in whole, or in part, by the individual elements 802-808 of the environment 800. It will be appreciated that although certain components of the digital design system 600 are described in the previous examples with regard to particular elements of the environment 800, various alternative implementations are possible. For instance, in one or more embodiments, the digital design system 600 is implemented on any of the client devices 806A-806N. Similarly, in one or more embodiments, the digital design system 600 may be implemented on the one or more servers 804. Moreover, different components and functions of the digital design system 600 may be implemented separately among client devices 806A-806N, the one or more servers 804, and the network 808.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
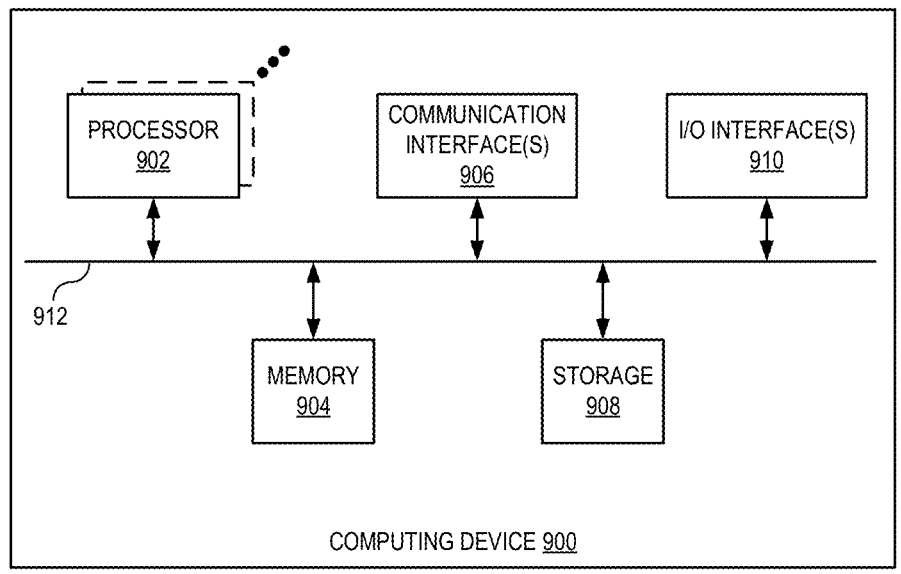
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that one or more computing devices such as the computing device 900 may implement the digital design system. As shown by FIG. 9, the computing device can comprise a processor 902, memory 904, one or more communication interfaces 906, a storage device 908, and one or more input or output ("I/O") devices/interfaces 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 908 and decode and execute them. In various embodiments, the processor(s) 902 may include one or more central processing units (CPUs), graphics processing units (GPUs), field programmable gate arrays (FPGAs), systems on chip (SoC), or other processor(s) or combinations of processors.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 can further include one or more communication interfaces 906. A communication interface 906 can include hardware, software, or both. The communication interface 906 can provide one or more interfaces for communication (such as, for example, packet-based communication) between the computing device and one or more other computing devices 900 or one or more networks. As an example, and not by way of limitation, communication interface 906 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

The computing device 900 includes a storage device 908 includes storage for storing data or instructions. As an example, and not by way of limitation, storage device 908 can comprise a non-transitory storage medium described above. The storage device 908 may include a hard disk drive (HDD), flash memory, a Universal Serial Bus (USB) drive or a combination these or other storage devices. The computing device 900 also includes one or more I/O devices/interfaces 910, which are provided to allow a user to provide input to (such as user strokes), receive output from, and otherwise transfer data to and from the computing device 900. These I/O devices/interfaces 910 may include a mouse, keypad or a keyboard, a touch screen, camera, optical scanner, network interface, modem, other known I/O devices or a combination of such I/O devices/interfaces 910. The touch screen may be activated with a stylus or a finger.

The I/O devices/interfaces 910 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 910 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method, comprising:
   receiving an input, the input including a video sequence;
   detecting motion beats of a moving person in the video sequence by:
     identifying a point of interest on the moving person for body tracking,
     calculating a mean position of the point of interest in the video sequence,
     identifying a greatest distance from the calculated mean position of the point of interest,
     generating a ring centered at the calculated mean position having a radius equal to the identified greatest distance from the point of interest, wherein the ring has a specified number of evenly distributed points,
     determining position data for the point of interest at each frame of the video sequence, including information indicating a distance of the point from each of the specified number of evenly distributed points,
     generating a representation of motion based on the determined position data, and
     determining the motion beats for the video sequence using the generated representation of motion;
   detecting audio beats in an audio sequence;
   modifying the video sequence by matching the detected motions beats in the video sequence to the detected audio beats in the audio sequence; and
   outputting the modified video sequence.

2. The computer-implemented method of claim 1, wherein detecting the motion beats in the video sequence comprises:
   detecting the motion beats in the video sequence based on body tracking of the moving person in the video sequence; and
   identifying a timestamp for each of the detected motion beats.

3. The computer-implemented method of claim 2, wherein modifying the video sequence by matching the detected motions beats in the video sequence to the detected audio beats in the audio sequence comprises:
   dynamically warping the video sequence by aligning each timestamp for the detected motion beats to one of a plurality of timestamps for the detected audio beats.

4. The computer-implemented method of claim 2, wherein detecting the motion beats in the video sequence based on the body tracking of the moving person in the video sequence further comprises:
   applying a body tracking algorithm to the moving person in the video sequence; and
   identifying the point of interest on the moving person for body tracking based on the body tracking algorithm.

5. The computer-implemented method of claim 4, wherein determining the motion beats for the video sequence using the generated representation of motion further comprises:
   extracting an onset envelope from the representation of motion for the point of interest;
   generating a final onset envelope for the video sequence based on the extracted onset envelopes for the point of interest; and
   selecting onset motion peaks as the motion beats from the final onset envelope for the video sequence.

6. The computer-implemented method of claim 5, further comprising:
   calculating a confidence score for the point of interest in each frame; and
   masking out the onset envelope for the point of interest when a confidence score for the point of interest is below a threshold value.

7. The computer-implemented method of claim 1, further comprising:
   receiving one or both of a selection of a subset of the detected motion beats and a selection of a subset of the detected audio beats.

8. The computer-implemented method of claim 1, wherein detecting the motion beats in the video sequence further comprises:
   determining that the video sequence includes a plurality of video sequences, each video sequence of the plurality of video sequences having a moving person;
   segmenting each of the plurality of video sequences into a separate channel; and
   separately detecting the motion beats of the moving person in each video sequence of the plurality of video sequences.

9. The computer-implemented method of claim 8, wherein modifying the video sequence by matching the detected motions beats in the video sequence to the detected audio beats in the audio sequence further comprises:
   dynamically warping each of one or more separate channels in the video sequence by aligning each timestamp for the detected motion beats of each of the one or more separate channels to one of a plurality of timestamps for the detected audio beats.

10. The computer-implemented method of claim 1, wherein detecting the motion beats in the video sequence further comprises:

determining that the video sequence includes multiple moving persons;

isolating each of the multiple moving persons into a separate video layer; and separately detecting the motion beats of the moving person in each video layer.

11. A non-transitory computer-readable storage medium including instructions stored thereon which, when executed by at least one processor, cause the at least one processor to:

receive an input, the input including a video sequence;

detect motion beats of a moving person in the video sequence by:

identifying a point of interest on the moving person for body tracking, calculating a mean position of the point of interest in the video sequence, identifying a greatest distance from the calculated mean position of the point of interest, generating a ring centered at the calculated mean position having a radius equal to the identified greatest distance from the point of interest, wherein the ring has a specified number of evenly distributed points, determining position data for the point of interest at each frame of the video sequence, including information indicating a distance of the point from each of the specified number of evenly distributed points, generating a representation of motion based on the determined position data, and determining the motion beats for the video sequence using the generated representation of motion;

detect audio beats in an audio sequence;

modify the video sequence by matching the detected motions beats in the video sequence to the detected audio beats in the audio sequence; and output the modified video sequence.

12. The non-transitory computer-readable storage medium of claim 11, wherein detecting the motion beats in the video sequence comprises:

detecting the motion beats in the video sequence based on body tracking of the moving person in the video sequence; and identifying a timestamp for each of the detected motion beats.

13. The non-transitory computer-readable storage medium of claim 12, wherein modifying the video sequence by matching the detected motions beats in the video sequence to the detected audio beats in the audio sequence comprises:

dynamically warping the video sequence by aligning each timestamp for the detected motion beats to one of a plurality of timestamps for the detected audio beats.

14. The non-transitory computer-readable storage medium of claim 12, wherein detecting the motion beats in the video sequence based on the body tracking of the moving person in the video sequence further comprises:

applying a body tracking algorithm to the moving person in the video sequence;

identifying the point of interest on the moving person for body tracking based on the body tracking algorithm.

15. The non-transitory computer-readable storage medium of claim 14, wherein determining the motion beats for the video sequence using the generated representation of motion further comprises:

extracting an onset envelope from the representation of motion for the point of interest;

generating a final onset envelope for the video sequence based on the extracted onset envelopes for the point of interest; and selecting onset motion peaks as the motion beats from the final onset envelope for the video sequence.

16. A system, comprising:

a computing device including a memory and at least one processor, the computing device implementing a digital design system, wherein the memory includes instructions stored thereon which, when executed, cause the digital design system to:

receive an input, the input including a video sequence;

detect motion beats of a moving person in the video sequence by:

identifying a point of interest on the moving person for body tracking, calculating a mean position of the point of interest in the video sequence, identifying a greatest distance from the calculated mean position of the point of interest, generating a ring centered at the calculated mean position having a radius equal to the identified greatest distance from the point of interest, wherein the ring has a specified number of evenly distributed points, determining position data for the point of interest at each frame of the video sequence, including information indicating a distance of the point from each of the specified number of evenly distributed points, generating a representation of motion based on the determined position data, and determining the motion beats for the video sequence using the generated representation of motion;

detect audio beats in an audio sequence;

modify the video sequence by matching the detected motions beats in the video sequence to the detected audio beats in the audio sequence; and output the modified video sequence.

17. The system of claim 16, wherein the instructions to detect the motion beats in the video sequence, further causes the digital design system to:

detect the motion beats in the video sequence based on body tracking of the moving person in the video sequence; and identify a timestamp for each of the detected motion beats.

18. The system of claim 17, wherein the instructions to modify the video sequence by matching the detected motions beats in the video sequence to the detected audio beats in the audio sequence, when executed, further causes the digital design system to:

dynamically warp the video sequence by aligning each timestamp for the detected motion beats to one of a plurality of timestamps for the detected audio beats.

19. The system of claim 17, wherein the instructions to detect the motion beats in the video sequence based on the body tracking of the moving person in the video sequence, when executed, further causes the digital design system to:

apply a body tracking algorithm to the moving person in the video sequence;

identify the point of interest on the moving person for body tracking based on the body tracking algorithm.

20. The system of claim 19, wherein the instructions to determine the motion beats for the video sequence using the generated representation of motion, when executed, further causes the digital design system to:
- extract an onset envelope from the representation of motion for the point of interest;
- generate a final onset envelope for the video sequence based on the extracted onset envelopes for the point of interest; and
- select onset motion peaks as the motion beats from the final onset envelope for the video sequence.

* * * * *